United States Patent [19]

Teraoka

[11] 4,441,597
[45] Apr. 10, 1984

[54] AUTOMATIC HUB CLUTCH

[75] Inventor: Masao Teraoka, Sano, Japan

[73] Assignee: Tochigi-Fuji Sangyo Kabushiki Kaisha, Tochigi, Japan

[21] Appl. No.: 323,707

[22] Filed: Nov. 20, 1981

[30] Foreign Application Priority Data

Apr. 28, 1981 [JP] Japan ............................ 56-62400[U]

[51] Int. Cl.³ .......................... F16D 1/06; F16D 43/00
[52] U.S. Cl. ........................................ 192/35; 192/54; 192/67 R; 192/93 A; 403/1
[58] Field of Search .............. 192/35, 54, 67 R, 93 A, 192/49; 403/1

[56] References Cited

U.S. PATENT DOCUMENTS

| | | | |
|---|---|---|---|
| 4,192,411 | 3/1980 | Fogelberg | 192/93 A X |
| 4,238,014 | 12/1980 | Petrak | 192/54 |
| 4,281,749 | 8/1981 | Fogelberg | 192/36 |
| 4,327,821 | 5/1982 | Telford | 192/67 R X |

FOREIGN PATENT DOCUMENTS 2055998 3/1981 United Kingdom ................. 192/35

Primary Examiner—Rodney H. Bonck
Assistant Examiner—James J. Merek
Attorney, Agent, or Firm—Wenderoth, Lind & Ponack

[57] ABSTRACT

An automatic hub clutch used for connection and disconnection of a drive axle with a wheel of a four-wheel drive vehicle includes a simple mechanism having a short axial length. The hub clutch includes a first spring adapted to bias a slide gear toward disengagement, and a second spring disposed between and coaxially with the first spring and the slide gear, and adapted to bias the slide gear toward engagement through a cam.

2 Claims, 6 Drawing Figures

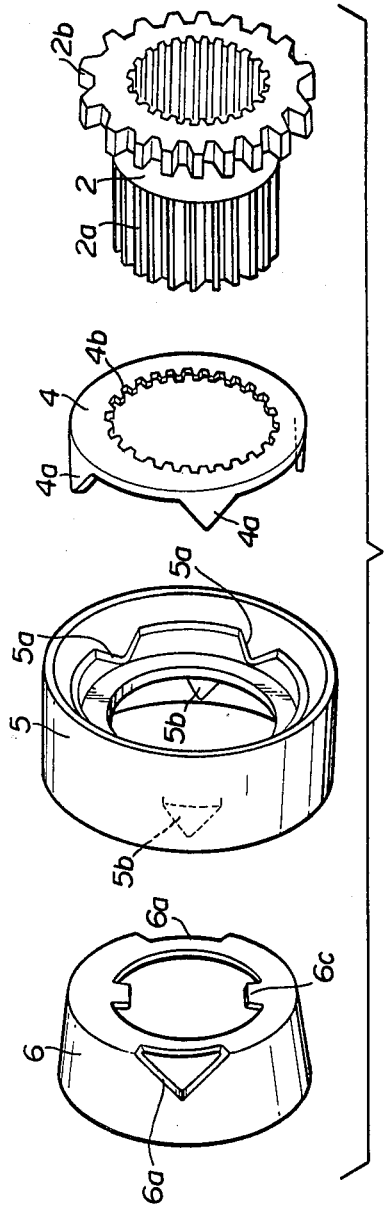
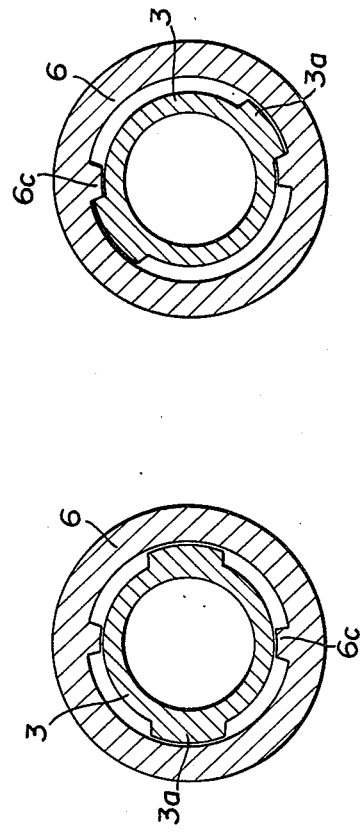
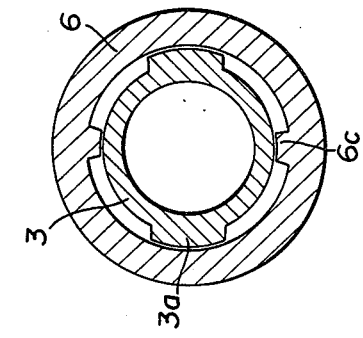
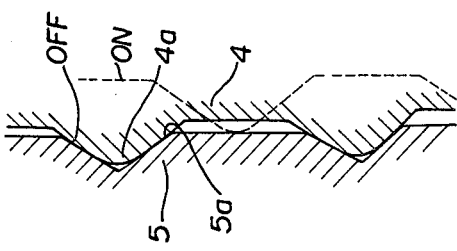

AUTOMATIC HUB CLUTCH

BACKGROUND OF THE INVENTION

The present invention relates to an automatic hub clutch used for connection and disconnection of a drive axle with a wheel of a four-wheel drive vehicle and more particularly, to a hub clutch which is simple in construction and which has a short axial length, compared to that of the prior art.

Heretofore, various types of hub clutches have been used for engaging a drive shaft or axle with associated wheels of a four-wheel vehicle. For example, U.S. patent Ser. No. 27,347 filed Apr. 5, 1979, corresponding to U.S. Pat. No. 4,281,749, discloses an automatic locking clutch comprising a return spring restricting the axial movement of a slide gear, and a thrust transmission or load spring. The return spring and the load spring are disposed axially forward and backward of the slide gear, respectively. Upon development of thrust, the return spring is compressed by a plurality of fingers extended through the slide gear to permit the slide gear to move in its axial direction, thereby engaging the slide gear with a driven gear to provide a four-wheel drive mode.

According to this clutch, the return spring can restrict the axial movement of the slide gear unless an axial thrust higher than a predetermined level is applied by a cam. Therefore, spurious movement of the slide gear may be prevented by the action of the return spring, even upon an increase in viscous drag of lubricating oil resulting from a decrease of atmospheric temperatures or upon development of gravity or forces in the lateral direction resulting from sudden cornering of the vehicle and the like.

However, such an automatic locking clutch has problems in that the axial length of the clutch is large because of the return spring, the slide gear and the thrust transmission spring are arranged axially in series with each other, and the fingers extended through the slide gear and its associated structure make the construction of the clutch very complicated. The large axial size of the clutch results in a legal problem due to protruding of the rotating portions out of the outside width of the vehicle, the problem that the protruded rotating portions are subject to damage upon off-load running, and so forth.

SUMMARY OF THE INVENTION

This invention relates to an improved automatic hub clutch which will overcome the problems described above.

It is therefore an object of this invention to provide an improved automatic hub clutch for connection and disconnection of a drive axle with a wheel of a four-wheel drive vehicle, which has a simple mechanism or construction and a short axial length. The clutch of this invention includes first spring means adapted to bias a slide gear toward disengagement, and second spring means to transmit an axial thrust of cam means, disposed between and coaxially with the first spring means and the slide gear, and adapted to bias the slide gear toward engagement through the cam means.

It is another object of this invention to provide an improved automatic hub clutch having a mechanism capable of development of spurious movement of a slidable or movable member to cause clutch engagement even upon an increase in viscous drag of lubricant resulting from a decrease in atmospheric temperatures or upon development of lateral gravity or forces resulting from sudden cornering of the vehicle.

It is still another object of this invention to provide an improved automatic hub clutch having a mechanism capable of developing the braking force only upon clutch connection and disconnection, thereby lowering energy loss and temperatures of the braking member and improving durability of the braking member.

Other objects include the provision of a simple mechanism which may be manufactured at relatively low cost and which is easy and simple to install.

According to a preferred embodiment of this invention, the automatic hub clutch comprises a slide gear engaged to a drive shaft through splines formed thereon and movable in the axial direction of the drive shaft, a housing being adapted for engagement and disengagement with the slide gear through the axial movement of the slide gear, first spring means disposed between the slide gear and the housing and having a predetermined resilient force and adapted to bias the slide gear toward the disengagement of the slide gear with the housing, second spring means disposed between the coaxially with the first spring means and the slide gear and having a resilient force lower than that of the first spring means and adapted to bias the slide gear toward the engagement of the slide gear with the housing, and cam means engaged with the first and second spring means, and adapted (1) to develop an axial thrust required to compress the first spring means and then to permit the second spring means to bias the slide gear toward engagement upon rotation of the drive shaft, and (2) to permit the first spring means to bias the slide gear toward disengagement upon nonrotation of the drive shaft.

The above and other objects, advantages and features of the present invention will become apparent to those skilled in the art from the following description taken in conjunction with the accompanying drawings, wherein:

BRIEF DESCRIPTION OF THE DRAWINGS

FIG. 2 is a partial exploded view of the hub clutch members shown in FIG. 1;

FIG. 3 is a partial enlarged sectional view of a portion of the structure shown in FIG. 1;

FIG. 4A is a cross sectional view illustrating a drive shaft and a brake member in a disengaged position thereof; and FIG. 4B is a cross sectional view illustrating the drive shaft and a brake member in an engaged position thereof.

DESCRIPTION OF THE PREFERRED EMBODIMENT

Figure 1B:
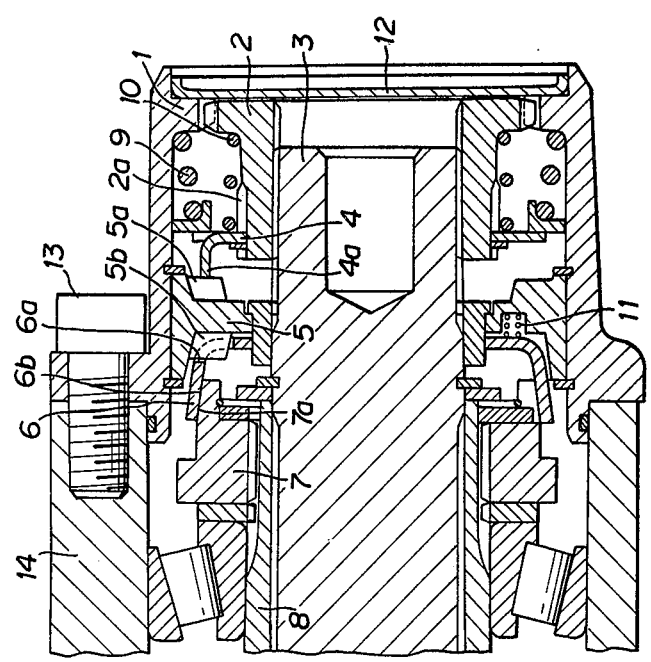
FIG. 1B is longitudinal sectional view illustrating the embodiment of the present invention in its engaged position.
Figure 1A:
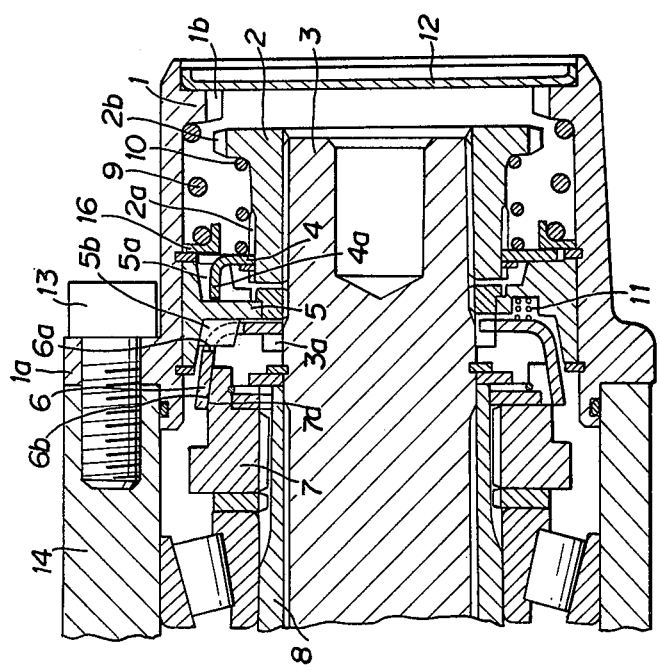
FIG. 1A is a longitudinal sectional view illustrating a preferred embodiment of the present invention in its disengaged position.

Referring now to FIG. 1A, there is shown a hub clutch in its disengaged position according to the present invention. In FIG. 1A, a rotatable clutch housing 1 is secured through its outer flange portion 1a to a wheel hub 14 such as a front wheel hub of a four-wheel drive vehicle by a plurality of bolts 13 and has coupling teeth 1b formed on its inner periphery. An axially movable slide gear 2 in the form of sleeve is disposed radially inwardly of the clutch housing 1. This slide gear 2 has coupling teeth 2b formed axially outwardly of the outer periphery thereof and adapted to be engaged with the teeth 1b of the housing 1, and also has splines 2a formed on the outer periphery and axially inwardly of teeth 26. The slide gear 2 is slidably engaged with a rotatable drive shaft 3, which is one form of the invention may be an axle of a four-wheel drive vehicle, through their splines. Into the splines 2a of the slide gear 2 is movably engaged a ring-shaped cam member 4 through a set of grooves 4b formed on the inner periphery thereof. The cam member 4 is axially movable over a predetermined distance and has a plurality of V-shaped projections 4a spaced circumferentially apart from each other (refer to FIG. 2). As shown in FIG. 2, retainer 5 is rotatably disposed around the drive shaft 3 and has a plurality of V-shaped grooves 5a engaged with corresponding projections 4a of the cam member 4, and a plurality of V-shaped projections 5b formed axially inwardly thereof. An axially movable brake member 6 is rotatably disposed around the drive shaft 3 and has a plurality of V-shaped camming grooves 6a engaged with corresponding V-shaped projections 5b of the retainer 5, a cone-shaped friction surface 6b formed axially inward thereof, and a plurality of projections 6c formed on its inner periphery. A nut or brake member 7 having a frusto-conical friction surface 7a to be engaged with the cone-shaped friction surface 6b of the brake member 6 is secured to a sleeve-shaped stationary member 8 fixed around the drive shaft 3. A first coil spring 9 having a predetermined resilient force is disposed between the housing 1 and a ring-shaped retainer member 16 arranged adjacent to the cam member 4 so as to bias the cam member axially inwardly. A second coil spring 10 having a resilient force lower than that of the first coil spring 9 is disposed between and coaxially with the first coil spring 9 and the slide gear 2. Between the retainer 5 and the brake member 6 is interposed a coil spring 11 to lightly push the brake member 6 against the nut 7. The opening of the housing 1 is sealed by a cover 12.

In operation of the automatic hub clutch described above, when switching a selective lever (not shown) arranged in a suitable place with respect to an operator's seat, from two-wheel drive over to four-wheel drive, the drive shaft 3 starts to rotate. With the rotation of the drive shaft 3, the slide gear 2 axially movably splined to the drive shaft 3 rotates together with the cam member 4. Since V-shaped projections 4a of the cam member 4 are engaged into the V-shaped grooves 5a of the retainer 5 at this point of time, the retainer 5 is also rotated by the cam member 4 (see FIGS. 2 and 3). Consequently, the brake member 6 is rotated by the V-shaped projections 5b of the retainer 5. The brake member 6, lightly contacting the conical surface 7a of the nut or brake member 7, is further pushed thereagainst it by the wedge action developed between the V-shaped projections 5b and the V-shaped grooves 6a of the brake member 6, thereby increasing the braking force. A desired braking force can be provided by suitable combination of an angle of the V-shaped grooves 6a with a conical angle of the brake member 6 so that the brake member 6 is not allowed to slip relative to the nut 7. Because the nut 7 is secured to the stationary member 8, rotation of the brake member 6 and thus rotation of the retainer 5 are restrained. Consequently, relative rotation is provided between the cam member 4 and the retainer 5 to develop an axial thrust therebetween, thereby to cause the cam member 4 to move axially outwardly while compressing the first coil spring 9. Then, the slide gear 2 is moved to the position shown in FIG. 1B by the action of the coil spring 10, so that the drive shaft 3 is connected to the housing 1, thereby providing a four-wheel drive mode. At this point of time, the projections 4a of the cam member move axially outwardly of the V-shaped grooves 5a of the retainer 5, and consequently the force to rotate the retainer 5 and thus the force to push the brake member 6 against the nut 7 is terminated. In such a case, the drive shaft 3 rotates relative to the brake 6. That is, the position of projections 3a of the drive shaft 3 relative to the projections 6c of the brake member 6 shifts from the relative position shown in FIG. 4A to that of FIG. 4B, and thus the brake member 6 is rotated directly by the projections 3a of the drive shaft 3. As described above, at this time only the light resilient force of the coil spring 11 makes the brake member 6 contact the nut 7, because an axial thrust is not applied to the camming grooves 6a, thereby making it possible to prevent an increase of frictional drag therebetween.

When the operator desires to establish two-wheel drive, he stops the vehicle and disengages four-wheel drive. The operator moves the vehicle in the opposite direction slightly and thus, the projections 3a of the drive shaft 3 leave the projections 6c of the brake member 6. Input to the brake member 6 is now applied only through the V-shaped grooves 6a and thus the brake member 6 is fixed to the nut 7. With movement of the vehicle the wheels rotate. As can be seen from FIG. 1B, both the slide gear 2 and the drive shaft 3 are rotated by the clutch housing 1, but the retainer 5 is rotated relative to the cam member 4 because the retainer 5 is fixed by the brake member 6, and the V-shaped projections 4a of the cam member 4 fall into the grooves 5a of the retainer 5 due to action of the first coil spring 9. Consequently, the slide gear 2 moves to the position shown in FIG. 1A while compressing the first coil spring 10 thereby disengaging the clutch housing 1 from the drive shaft 3 to provide two-wheel drive.

From the above, it will be understood that the features of the present invention, that is simplicity of the mechanism, short axial length, and reliability in operation, are attributable to such constructions that the axial movement of the cam means is transmitted directly to the first coil spring or return spring, and the first and second coil springs are disposed radially outwardly of and coaxially with the slide gear.

Although the present invention has been described with reference to a preferred embodiment thereof, many modifications and alterations may be made within the spirit and scope of the present invention.

What is claimed is:

1. An automatic hub clutch for a four-wheel drive vehicle and comprising:
   a drive shaft adapted to be rotated in a four-wheel drive mode and not to be rotated in a two-wheel drive mode;
   a housing rotatably mounted with respect to said drive shaft, said housing having coupling teeth;
   a slide gear having coupling teeth, said slide gear being mounted to be rotated in response to rotation of said drive shaft and to be movable axially thereof between an engagement position, whereat said coupling teeth of said slide gear mesh with said coupling teeth of said housing, and a disengagement position, whereat said coupling teeth of said slide gear are spaced from and not meshed with said coupling teeth of said housing;

first spring means, positioned between said slide gear and said housing and having a predetermined spring force, for biasing said slide gear axially of said drive shaft to said disengagement position;

second spring means, having a spring force less than said predetermined spring force of said first spring means, for biasing said slide gear axially of said drive shaft to said engagement position, said second spring means being positioned radially between said first spring means and said slide gear and coaxial thereto; and cam means in engagement with said first and second spring means for, upon rotation of said drive shaft, causing compression of said first spring means and thereby enabling said second spring means to move said slide gear axially to said engagement position, and for, upon nonrotation of said drive shaft, enabling said first spring means to move said slide gear axially to said disengagement position.

2. An automatic hub clutch as claimed in claim 1, wherein said cam means comprises a brake member for developing a predetermined braking force through a resilient force upon rotation of said brake member relative to said drive shaft, retainer means engaging with said brake member for developing an axial thrust for increasing said braking force, and a cam member engaging with said retainer means for developing an axial thrust for causing said compression of said first spring means.

* * * * *